United States Patent [19]

Shinomiya et al.

[11] Patent Number: 4,829,188

[45] Date of Patent: May 9, 1989

[54] PHOSPHOR MATERIALS FOR RADIATION INTENSIFYING SCREENS AND RADIATION INTENSIFYING SCREENS CONTAINING THE PHOSPHOR MATERIALS

[75] Inventors: Genichi Shinomiya; Satoru Chikutei, both of Anan, Japan

[73] Assignee: Nichia Kagaku Kogyo K.K., Tokushima, Japan

[21] Appl. No.: 103,419

[22] Filed: Oct. 1, 1987

[30] Foreign Application Priority Data

Oct. 6, 1986 [JP] Japan .................. 61-238873

[51] Int. Cl.$^4$ .................. G01T 21/64; H01J 1/70
[52] U.S. Cl. .................. 250/483.1; 252/301.4 H; 252/301.5; 428/690; 428/691
[58] Field of Search .................. 250/483.1, 484.1 R; 252/301.4 H, 301.5; 428/403, 690, 691

[56] References Cited

U.S. PATENT DOCUMENTS

| | | | |
|---|---|---|---|
| 1,909,365 | 5/1933 | Knabner | 252/301.5 |
| 4,068,128 | 1/1978 | Chenot et al. | 250/483.1 |
| 4,109,152 | 8/1978 | Aoki et al. | 250/486.1 |
| 4,138,529 | 2/1979 | Mori et al. | 250/483.1 |
| 4,507,563 | 3/1985 | Maeoka et al. | 250/483.1 |
| 4,631,409 | 12/1986 | Sparacia et al. | 250/483.1 |
| 4,645,721 | 2/1987 | Arakawa et al. | 428/690 |
| 4,684,539 | 8/1987 | Chenot et al. | 427/64 |
| 4,733,089 | 3/1988 | Kitada et al. | 250/483.1 |

FOREIGN PATENT DOCUMENTS 52-156188 6/1976 Japan.

OTHER PUBLICATIONS

Patent Abstracts of Japan, vol. 4, No. 182, (c-35) [664], Dec. 16, 1980; & JP-A-55 123 675 (Tokyo Shibaura Denki K.K.) 09-24-1980.
Patent Abstracts of Japan, vol. 7, No. 100 (C-164) [1245] Apr. 28, 1983; & JP-A-58 27 776 (Hitachi Seisakusho K.K.) 02-18-1983.
Patent Abstracts of Japan, p. 5068 C 77; & JP-A-52 156 188 (Sony K.K.) 12-26-1977.

Primary Examiner—Janice A. Howell
Assistant Examiner—William F. Rauchholz
Attorney, Agent, or Firm—Nixon & Vanderhye

[57] ABSTRACT

A phosphor material for a radiation intensifying screen includes phosphor particles which emit light upon radiation excitation, and alkaline-earth metal fluoride. The alkaline-earth metal fluoride is formed in situ on the surface of the phosphor particles through a reaction of a first reactant containing the alkaline-earth metal with a second reactant containing the fluoride to improve the dispersibility of the phosphor particles. The phosphor material is dispersed in a binder and coated on a base support as a phosphor layer to provide a radiation intensifying screen.

13 Claims, 4 Drawing Sheets

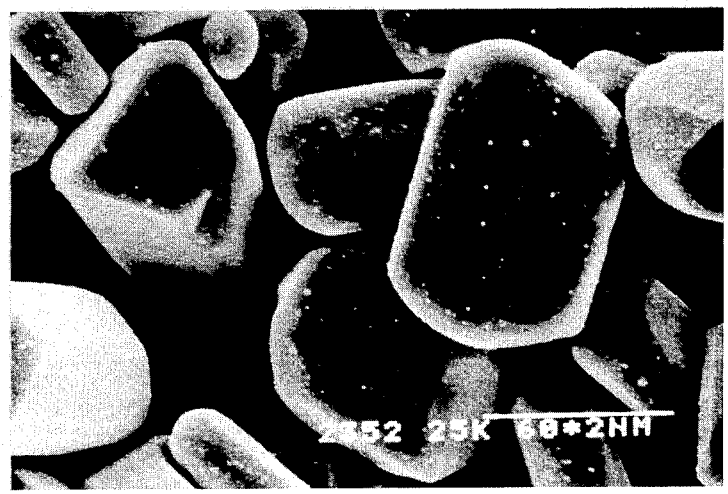
F I G. 1

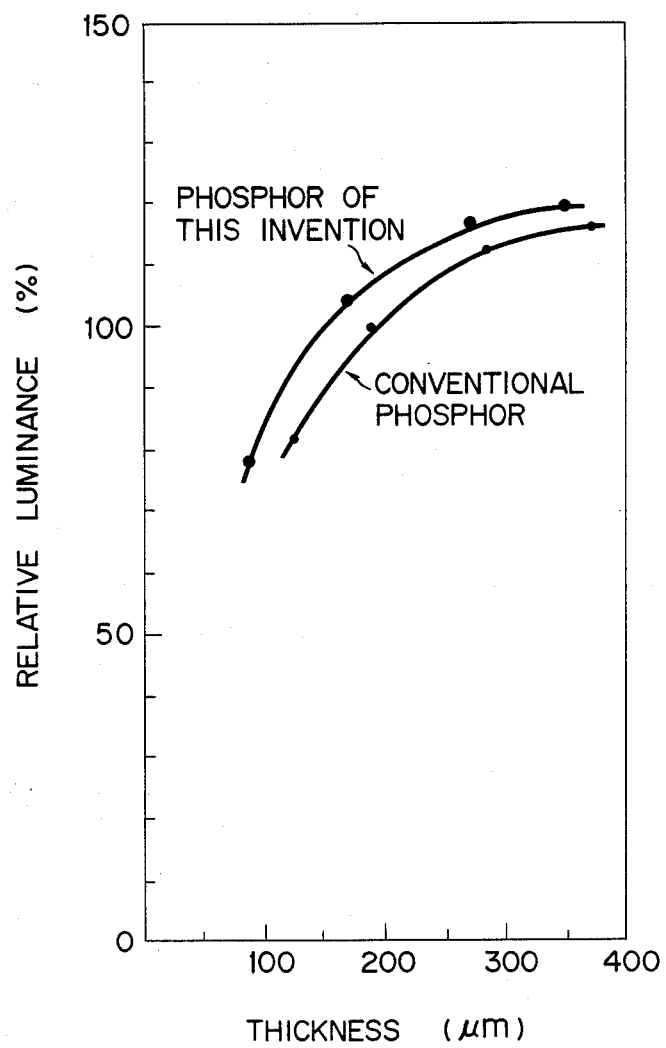
F I G. 4

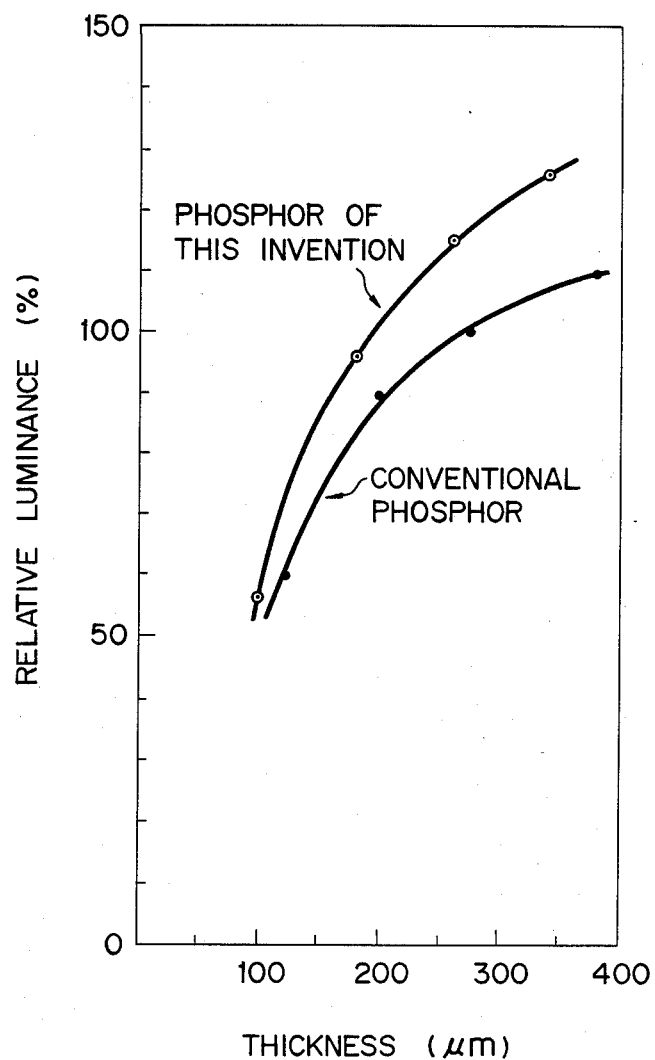
F I G. 5

PHOSPHOR MATERIALS FOR RADIATION INTENSIFYING SCREENS AND RADIATION INTENSIFYING SCREENS CONTAINING THE PHOSPHOR MATERIALS

BACKGROUND OF THE INVENTION

This invention relates to phosphor materials for radiation intensifying screens and intensifying screens containing the same.

DESCRIPTION OF THE PRIOR ART

In various fields of radiography, such as a medical radiography, such as a medical roentogenography for medical diagnosis, and an industrial radiography for the nondestructive examination of materials, a radiation intensifying screen is employed such that it is attached to a photographic film in order to enhance the utilization factor of the radiation and hence to improve the photographic sensitivity. The intensifying screen contains a phosphor layer of high radiation absorptivity which is supported on a base support. A light beam which is emitted from a phosphor with radiation exposure is recorded on the photographic film.

In general, the intensifying screen is formed through the mixing of a radiation phosphor with a binder, preparation of a coating liquid with a solvent added to the mixture and coating of the liquid on the base support followed by a drying step. However, the conventional phosphor, such as a calcium tungstate phosphor, europium-activated barium halide phosphor, or thulium-activated yttrium tantalate phosphor reveals poor compatibility with a binder, such as a cellulose derivative, poly (alkyl methacrylate), polyurethane or linear polyester, and with a solvent, such as an ester of a lower fatty acid with a lower alcohol, a ketone or an ether, or poor dispersibility in a binder and a solvent. Thus, the packing density of the phosphor is low in the resultant phosphor layer. In order to obtain a predetermined emission luminance it is necessary to increase the thickness of the phosphor layer by that extent. Furthermore, because of the poor compatibility of the conventional phosphor with the binder and the solvent the coating solution becomes highly viscous, resulting in low operability. In order to attain improvement, a considerably greater amount of solvent needs to be added to the aforementioned mixture.

SUMMARY OF THE INVENTION

A principal object of this invention is to provide phosphor materials excellent in dispersibility in a binder and a solvent, and intensifying screens containing the phosphor material.

Another object of this invention is to provide phosphor materials, and intensifying screens containing the material, which can reduce the thickness of the phosphor layer of the intensifying screen and hence lower the structure mottle of the intensifying screen.

The aforementioned and other objects which will become apparent from the following descriptions are achieved by a phosphor material for a radiation intensifying screen, which comprises:

phosphor particles which emit light upon radiation excitation; and an alkaline-earth metal fluoride formed in situ on the surface of the phosphor particles through a reaction of a first reactant containing the alkaline-earth metal with a second reactant containing fluorine and attached to the surface of the phosphor particles to thereby improve the dispersibility of the phosphor particles.

BRIEF DESCRIPTION OF THE DRAWINGS

FIG. 1 is an SEM photograph showing a phosphor material of this invention;

FIG. 2 is a cross-sectional view showing a structure of an intensifying screen; and FIGS. 3 to 5 show a comparison between the characteristic of an intensifying screen of this invention and that of a conventional intensifying screen.

DETAILED DESCRIPTION OF THE PREFERRED EMBODIMENTS

Figures 2, 3:
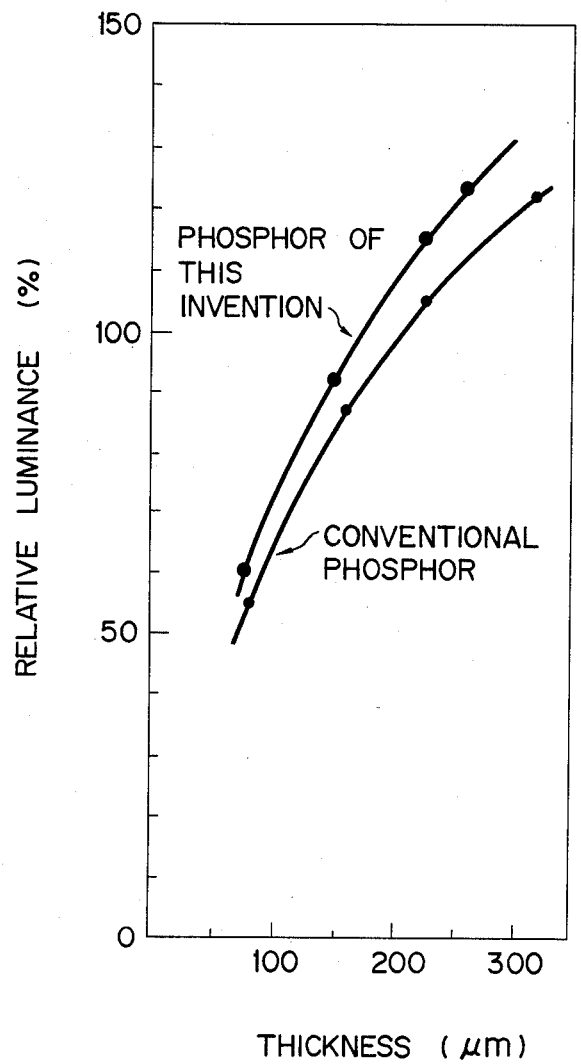

The inventors have made an extensive research in an effort to develop phosphor materials for intensifying screens which manifest excellent dispersibility in a binder and a solvent, and have found that the dispersibility of the phosphor is improved by attaching an alkaline-earth metal fluoride to the surface of the phosphor particles through a reaction of a reactant containing the alkaline-earth metal with a reactant containing fluorine.

The phosphor as employed in this invention emits light upon radiation excitation, for example, through an X-ray excitation, and includes calcium tungstate, yttrium strontium tantalate, europium-activated barium halide (for example, europium-activated barium chloride fluoride), and thulium-activated yttrium tantalate phosphors. As the phosphor of this invention, use may be made of a phosphor which is disclosed and claimed in:

(1) Nakajima et al. U.S. Ser. No. 823,299, filed Jan. 28, 1986, entitled "PHOSPHOR WHICH EMITS LIGHT BY THE EXCITATION OF X-RAY, AND AN X-RAY INTENSIFYING SCREEN USING THE PHOSPHOR" now abandoned; and (2) Nakajima et al. U.S. Ser. No. 931,066, filed Nov. 17, 1986, entitled "X-RAY PHOSPHORS AND X-RAY INTENSIFYING SCREEN USING THE PHOSPHOR".

To be brief, the phosphor disclosed in U.S. Ser. No. 823,299 is given by the formula:

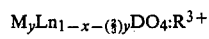

$$M_y Ln_{1-x-(\frac{2}{3})y} DO_4 : R^{3+}$$

where

M: at least one divalent metal selected from the group consisting of beryllium, magnesium, calcium, strontium, barium, zinc and cadmium;

Ln: at least one metal selected from the group consisting of yttrium, gadolinium, lanthanum and lutetium;

D: tantalum or niobium;

R: at least one activator metal selected from the group consisting of thulium, praseodymium, samarium, europium, terbium, dysprosium and ytterbium;

X: 0 to 0.05

Y: $1 \times 10^{-5}$ to 1

The phosphor disclosed in U.S. Ser. No. 931,066 is given by the formula:

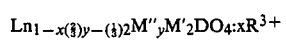

$$Ln_{1-x(\frac{2}{3})y-(\frac{1}{3})z} M''_y M'_2 DO_4 : xR^{3+}$$

where

M'': at least one divalent metal selected from the group consisting of beryllium, magnesium, calcium, strontium, barium, zinc and cadmium;

M': at least one alkali metal selected from the group consisting of lithium, sodium and potassium;

Ln: at least one metal selected from the group consisting of yttrium, gadolinium, lanthanum and lutetium;

D: tantalum or niobium;

R: at least one activator metal selected from the group consisting of thulium, praseodymium, samarium, europium, terbium, dysprosium ytterbium;

x: 0 to 0.05
y: $1 \times 10^{-5}$ to 1
z: $1 \times 10^{-4}$ to 0.1

The phosphor particles employed in this invention have normally an average particle size of 2 to 20 μm.

In the phosphor materials of this invention, an alkaline-earth metal fluoride is attached to the surface of the phosphor particles. As the fluoride use may be made of calcium fluoride, magnesium fluoride, barium fluoride and strontium fluoride. Among them use may be made of preferably calcium fluoride and barium fluoride and more preferably calcium fluoride.

The following method is adopted to attach the fluoride to the surface of the phosphor particles.

First, phosphor particles are suspended or dispersed in a reaction medium which does not substantially dissolves the phosphor and alkaline-earth metal fluoride therein. A first reactant containing alkaline-earth metal and a second reactant containing fluoride are added to the suspension or dispersion, and reacted there to form or deposit an alkaline-earth metal fluoride in situ on the surface of the phosphor particles. The first and second reactants are preferably added each in the form of solution in the reaction medium used. The reaction between the first and second reactants is usually carried out at 5° to 30° C. If the reaction temperature is higher, the particle size of the resultant fluoride particles become too large.

It is preferred that the reaction medium employed be water if the phosphor is not water-soluble and an organic medium, such as alcohol, if the phosphor is water-soluble. It is preferable to select first and second reactants of such a type that no insoluble byproduct is produced in the reaction medium during the production of the alkaline-earth metal fluoride yielded through the reaction of the first reactant with the second reactant. From this viewpoint it is preferable that alkaline metal halide (excluding fluoride), preferably a chloride, and ammonium fluoride be used as the first and second reactants, respectively. Most conveniently, an alkaline earth metal halide solution is added to the suspension of the phosphor and then an ammonium fluoride solution is added dropwise to the mix ture. The addition of ammonium fluoride is preferably conducted at a rate of 0.2 g/min. to 5 g/min. The reaction is substantially completed when the addition of ammonium fluoride is completed.

By so doing, the alkaline-earth metal fluoride in the form of particles of the order of 0.5 μm or less in size is relatively firmly and uniformly deposited on the surface of the phosphor particles. FIG. 1 is an SEM photograph showing a phosphor material of this invention. It is seen that very small particles of the fluoride are attached to the surfaces of the phosphor particles. In FIG. 1, "60*2NM" means $60 \times 10^2$ NM (6 μm).

The amount of the alkaline-earth metal fluoride to be deposited on the surface of the phosphor particles is determined, taking into consideration the dispersibility of the phosphor particles as well as the luminance. If the alkaline-earth metal fluoride is too small in its amount, it is not possible to obtain adequate dispersibility. If, on the other hand, the alkaline-earth metal fluoride is too large in its amount, the luminance as a whole will be lowered since the alkaline-earth metal fluoride itself does not emit luminescence. In general, the alkaline-earth metal fluoride is deposited on the surface of the phosphor particles in an amount of 0.01 to 30%, most preferably 0.3 to 5%, based on the weight of the phosphor particles. The amount of the alkaline-earth metal fluoride to be deposited can be controlled by the amounts of the first and second reactants fed, since the reaction of the first reactant with the second reactant progresses substantially quantitatively and the alkaline-earth metal fluoride produced during the reaction substantially all precipitates. Incidentally, an alkaline-earth metal fluoride cannot be deposited on the surface of the phosphor in an amount of 0.01% or more by dipping the phosphor particles in an aqueous solution of the alkaline-earth metal fluoride followed by filtering and drying, since the solubility of the fluoride in water is very small and the phosphor particles can contain water at most in an amount of several tens of grams per 100 grams of the phosphor particles after filtering.

FIG. 2 shows a structure of an intensifying screen. As seen from FIG. 2, intensifying screen 10 includes a sheet- or film-like base support 11 and phosphor layer 12 containing a phosphor material of this invention is formed on base support 11. Support 11 is normally formed of paper or plastics material, such as polyethylene terephthalate.

Phosphor layer 12 can be formed in the same way as in the conventional method as set forth above, except that the phosphor material of this invention is used instead of the conventional phosphor. That is, the phosphor material of this invention and binder are dispersed in a solvent. Examples of the binder are cellulose derivative, such as nitrocellulose or cellulose acetate; poly (alkyl methacrylate), such as poly (methyl methacrylate); polyurethane, and linear polyester. Examples of the solvent are an ester of lower fatty acid with lower alcohol, such as ethyl acetate or butyl acetate; ketone, such as acetone or methylethylketone; dioxane; ether, such as ethyleneglycol monoethylether; or a mixture thereof. The resultant mixture is coated on base support 11 by means of, for example, a doctor blade, roll coater or knife coater and dried up there to obtain an intensifying screen.

The phosphor material of this invention has better dispersibility in the associated binder and the solvent, and, even if somewhat greater in its amounts, low viscosity and hence a free- or smooth-flowing property in the form of the coating solution. It is, therefore, possible to enhance the packing density of the phosphor material in phosphor layer 12. As a result, the phosphor layer can be made small in thickness by about 10 to 40% as compared to a phosphor layer using a conventional phosphor not subjected to surface treatment, in order to obtain the same luminance. Thus, the structure mottle of the intensifying screen can be lowered when the phosphor material of this invention is used. Therefore, the use of the phosphor material of this invention can enhance the image characteristic, such as the granularity and sharpness. It is preferable to use the phosphor material of this invention and binder in a weight ratio of 1:50 to 1:300.

It is to be noted that phosphor layer 12 can be covered with protective layer 13 formed of, for example, cellulose material, polyethylene terephthalate.

This invention will now be explained below in conjunction with the following examples.

EXAMPLE 1

80 g of calcium tungstate phosphor particles (average particle size: 5 μm) was suspended in 500 ml of pure water, and 10 ml of 32.5% aqueous calcium chloride solution was added to the suspension. Then, while stirring the resultant mixture, 100 ml of 1% aqueous ammonium fluoride solution was added dropwise at 18° C. In this way, the calcium fluoride particles were substantially uniformly deposited on the surface of the phosphor particles. The suspension was separated into solid and liquid phase by decantation and the liquid phase (phosphor material) was dried for 5 hours at 120° C. The phosphor material contained calcium fluoride in an amount of 2.6% of the weight of the phosphor.

50 g of the phosphor material thus obtained was dispersed in a solution of 0.2 g of nitrocellulose in 9.8 g of butyl acetate, uniformly coated by a doctor blade on a polyethylene terephthalate film and naturally dried to give an intensifying screen. Similarly, various intensifying screens were prepared when phosphor layers had different thicknesses.

For comparison, intensifying screens wherein phosphor layers had different thickness were prepared in the same manner as described above except that calcium tantalate phosphor which had not been surface-treated was used instead of the phosphor material of this invention.

The intensifying screens thus prepared were measured for luminance by X-ray excitation. In the measurement, an aluminum foil was inserted between the intensifying screen and an X-ray tube with 50 kV of tube voltage and 2 mA of tube current.

FIG. 3 shows the result of measurement thus conducted. As evident from FIG. 3, the luminance of the intensifying screen using the phosphor of this invention with the calcium fluoride particles deposited thereon is about 10% higher than that of the intensifying screen using a conventional phosphor, provided that these screens have the same thickness of the phosphor layer. The intensifying screen using the phosphor material of this invention can be made 1.0 to 60 μm thinner than the conventional counter part, provided that the same luminance is obtained. Since the intensifying screen of this invention is less liable to suffer a structure mottle due to the reduction of the screen film thickness, thus improving the image characteristic, such as the granularity and sharpness.

EXAMPLE 2

Using 80 g of yttrium strontium tantalate phosphor particles (average particle size: 4 μm), 500 ml of pure water, 10 ml of 32.5% aqueous calcium chloride solution and 100 ml of 1% aqueous ammonium fluoride solution, calcium fluoride particles were deposited on the surface of the phosphor particles by the same manner as in Example 1. The phosphor material contained calcium fluoride in an amount of 2.6% based on the weight of the phosphor. An intensifying screen was prepared with the use of the phosphor material thus obtained, as in Example 1. This intensifying screen was compared in its luminance with the conventional intensifying screen having yttrium strontium tantalate phosphor particles not surface-treated with calcium fluoride, as in the case of Example 1 (see FIG. 4).

As evident from FIG. 4, the intensifying screen using the phosphor material of this invention which was surface-treated with calcium fluoride has a luminance 3 to 15% higher than that of the counterpart using a conventional phosphor, provided that the phosphor layers have the same thickness. According to this invention it is possible to improve the image characteristic of the intensifying screen because the phosphor layer thickness can be made 25 to 60 μm thinner than the conventional counterpart, provided that both have the same luminance.

EXAMPLE 3

80 g of europium (II)-activated barium chloride fluoride phosphor particles (average particle size: 2.4 μm) was suspended in 300 ml of methanol, 6 ml of 19% calcium chloride methanol solution was added to the suspension and, while stirring the solution, 76 ml of 1% ammonium fluoride methanol solution was added dropwise. In this way, the calcium fluoride particles were substantially uniformly deposited on the surface of the phosphor particles. Then the suspension was separated into solid and liquid phases by decantation, followed by drying the solid phase for 5 hours at 120° C. The phosphor material contained calcium fluoride in an amount of 2.0% based on the weight of phosphor.

Using the surface-treated phosphor of this invention and the conventional phosphor not surface-treated, intensifying screens were prepared, and compared for their luminance as in Example 1 (FIG. 5).

As evident from FIG. 5, when the intensifying screen using a phosphor of this invention, which was surface-treated with calcium fluoride, is compared with the counterpart using the conventional phosphor, the former is about 18% higher in luminance than the latter. It is, therefore, possible to improve the image characteristic, such as the granularity and sharpness, of the intensifying screen because the thickness of the phosphor layer can be reduced, provided that both the phosphors have the same luminance.

As set out above, a phosphor material for a radiation intensifying screen can be obtained according to this invention which, owing to the attachment of the particles of alkaline earth metal fluoride to the surface of the phosphor, can be formed as a coated film of high packing density on the base support with the phosphor particles very adequately dispersed in an associated binder and a solvent.

What is claimed is:

1. A phosphor material for a radiation intensifying screen, comprising:
   phosphor particles which emit light upon radiation excitation; and
   alkaline-earth metal fluoride particles formed and deposited in situ on the surface of the phosphor particles through a reaction of a first reactant containing an alkaline-earth metal halide with a second reactant containing the fluoride to improve the dispersibility of the phosphor particles.

2. The phosphor material according to claim 1, wherein said second reactant is ammonium fluoride.

3. The phosphor material according to claim 1, wherein said alkaline-earth metal fluoride is in the form of particles of 0.5 μm or less.

4. The phosphor material according to claim 1, wherein said phosphor particles are 2 to 20 μm in their average particle size.

5. The phosphor material according to claim 1, wherein said alkaline-earth metal fluoride is contained in an amount of 0.01 to 30% by weight based on the weight of said phosphor particles.

6. The phosphor material according to claim 1, wherein said alkaline earth metal fluoride is contained in an amount of 0.3 to 5% by weight based on the weight of the phosphor particles.

7. A radiation intensifying screen which is used for attachment to a radiographic film, comprising:
   a phosphor layer containing a phosphor material dispersed in a binder; and
   a base support supporting the phosphor layer,
   said phosphor material comprising;
      phosphor particles which emit light upon radiation excitation; and
      alkaline-earth metal fluoride particles formed and deposited in situ on the surface of the phosphor particles through a reaction of a first reactant containing an alkaline-earth metal halide with a second reactant containing the fluoride to improve the dispersibility of the phosphor particles.

8. The radiation intensifying screen according to claim 7, wherein said second reactant is ammonium fluoride.

9. The radiation intensifying screen according to claim 7, wherein said alkaline-earth metal fluoride is in the form of particles of 0.5 $\mu$m or less.

10. The radiation intensifying screen according to claim 7, wherein said phosphor particles have an average particle size of 2 to 20 $\mu$m.

11. The radiation intensifying screen according to claim 7, wherein said alkaline-earth metal fluoride is contained in a ratio of 0.01 to 30% by weight based on the weight of said phosphor particles.

12. The radiation intensifying screen according to claim 7, wherein said alkaline-earth metal fluoride is contained in a ratio of 0.3 to 5 weight percent based on the weight of said phosphor particles.

13. The radiation intensifying screen according to claim 7, wherein said phosphor layer is more than 10% thinner than a phosphor layer containing a phosphor material comprised of said phosphor alone, provided that both have the same luminance.

* * * * *